United States Patent
Herbst et al.

[11] Patent Number: 5,901,322
[45] Date of Patent: May 4, 1999

[54] METHOD AND APPARATUS FOR DYNAMIC CONTROL OF CLOCKS IN A MULTIPLE CLOCK PROCESSOR, PARTICULARLY FOR A DATA CACHE

[75] Inventors: Joseph E. Herbst, Milpitas; Ian E. Davis, Fremont, both of Calif.

[73] Assignee: National Semiconductor Corporation, Santa Clara, Calif.

[21] Appl. No.: 08/908,769

[22] Filed: Aug. 8, 1997

Related U.S. Application Data

[63] Continuation of application No. 08/536,223, Sep. 29, 1995, abandoned.
[60] Provisional application No. 60/002,427, Jun. 22, 1995.
[51] Int. Cl.[6] .................................................. G06F 1/32
[52] U.S. Cl. ........................... 395/750.04; 395/750.05; 395/560; 711/118
[58] Field of Search ..................... 395/750.03, 750.06, 395/560; 364/707; 711/118

[56] References Cited

U.S. PATENT DOCUMENTS

| | | | |
|---|---|---|---|
| 4,737,666 | 4/1988 | Umeda et al. | 307/480 |
| 5,029,126 | 7/1991 | Yamaguchi | 365/49 |
| 5,070,257 | 12/1991 | Farwell | 307/296.3 |
| 5,126,975 | 6/1992 | Handy et al. | 365/230.01 |
| 5,218,704 | 6/1993 | Watts et al. | 395/750 |
| 5,254,888 | 10/1993 | Lee et al. | 307/480 |
| 5,313,108 | 5/1994 | Lee et al. | 307/267 |
| 5,392,437 | 2/1995 | Matter et al. | 395/750 |
| 5,416,739 | 5/1995 | Wong | 395/467 |
| 5,420,808 | 5/1995 | Alexander et al. | 364/707 |
| 5,440,751 | 8/1995 | Santeler et al. | 395/800 |
| 5,452,401 | 9/1995 | Lin | 395/750 |
| 5,457,790 | 10/1995 | Iwamura et al. | 395/494 |
| 5,524,220 | 6/1996 | Verma et al. | 395/383 |
| 5,544,121 | 8/1996 | Dosaka et al. | 365/222 |
| 5,553,276 | 9/1996 | Dean | 395/550 |
| 5,557,781 | 9/1996 | Stones et al. | 395/557 |
| 5,632,038 | 5/1997 | Fuller | 395/750.06 |
| 5,666,537 | 9/1997 | Debnath et al. | 395/750.04 |

*Primary Examiner*—Meng-Ai T. An
*Assistant Examiner*—Sumati Lefkowitz
*Attorney, Agent, or Firm*—Limbach & Limbach LLP

[57] ABSTRACT

A method and apparatus are provided for controlling clocks for a processor and L2 cache. The clock signal to an L2 cache may be shut down in order to conserve power. Due to the nature of CMOS circuitry typically comprising the SRAM in an L2 cache, shutting down the clock signal to the L2 cache may significantly reduce the amount of power consumed by the L2 cache. A clock control circuitry may be provided to generate and control clock signals to a processor (e.g., Pentium® processor) and an L2 cache. Controllable clock skew adjustment may be provided to adjust relative timing between clock signals. Skew adjustment for the L2 cache clock may be provided with an AND gate for interrupting the clock signal. The AND gate may be controlled by one of a number of signals indicating status of the L2 cache. Address strobe, L2 idle, or pipelining conditions may determine whether the clock signal to the L2 cache may be interrupted. The use of combinational logic circuitry allows for seamless shutdown and restarting of the L2 cache clock signal. The present invention has particular application to a system where interface circuits may be used to interface a Pentium® processor to a VL bus.

5 Claims, 3 Drawing Sheets

METHOD AND APPARATUS FOR DYNAMIC CONTROL OF CLOCKS IN A MULTIPLE CLOCK PROCESSOR, PARTICULARLY FOR A DATA CACHE

This is a continuation of application Ser. No. 08/536,223 filed on Sep. 29, 1995, now abandoned.

CROSS-REFERENCE TO RELATED APPLICATIONS

This application claims priority under 35 U.S.C. §119(e) from Provisional Application Ser. No. 60/002,427, filed Jun. 22, 1995 entitled "METHOD AND APPARATUS FOR DYNAMIC CONTROL OF CLOCKS AND TAG INITIALIZATION" and incorporated herein by reference.

FIELD OF THE INVENTION

The present invention relates to an apparatus and method for controlling clocks in a multiple clock processor. In particular, the present invention provides a technique and apparatus for controlling the clock to a data cache so as to maintain performance of the cache, while allowing for shutdown of the cache for power saving and temperature reduction purposes. The present invention has particular application to portable, notebook, and lap-top computers, but may also be applied to other computers where energy savings and thermal management techniques are desired.

BACKGROUND OF THE INVENTION

Personal computers (PCs) may be provided with one of a number of types of microprocessor integrated circuits (e.g., Intel® 486, Pentium® or the like, Motorola® 68000 series, PowerPC® or other type of processor). For the purposes of this application, the term "PC" shall be construed to include desktop personal computers, work stations, lap top, portable, notebook, palm top or other types of computer systems.

For manufacturers of PCs, particularly in the IBM® compatible or ISA type environment, it may be desirable from a marketing standpoint to offer PCs with a range of processor types and/or speeds in a corresponding array of price ranges. Thus, for example, a line of PCs may be offered with different processors, from 486 type processors (typical of lower priced PCs at the time of filing of the present application) to Pentium® processors (usually offered in higher priced PCs at the time of filing of the present application).

In order to reduce manufacturing and inventory costs, it may be desirable to provide a common PC design which may accept either 486 or Pentium® processors. The use of the 486 and Pentium® processors is offered by way of example only, and the present invention is not limited to use of such processors. Other grades or ranges of processors may be applied within the spirit and scope of the present invention. However, such disparate processor types may require different clock speeds, data widths or the like, and thus it may be difficult to provide a single PC design which may accept disparate processor types.

In addition, it may be desirable to offer a PC design which may be upgraded from a lower power processor (e.g., 486 type) to a higher power processor (e.g., Pentium® type). Again, however, such upgradeability may present challenges due to the different processing requirements of the different processors, including clock speeds and data width.

In portable computers operating on battery power or in other energy saving computer systems, it may be desirable to reduce power consumption to prolong battery life or for thermal management considerations. In such systems, it may be desirable to shut down components not in use in order to conserve energy. However, some components, when shut down, may induce delays in processing when reactivated, causing delay or system failure. For example, a system memory cache, when shut down, may induce delays when restarted, negating its purpose of speeding processing or in a worse case, causing system failure.

SUMMARY AND OBJECTS OF THE INVENTION

It is an object therefore, of the present invention, to control a clock signal to a memory to reduce power consumption in a computer system.

It is a further object of the present invention to interrupt and resume a clock signal to a memory in a seamless, transparent fashion.

It is a further object of the present invention to reduce power consumption in a computer system by interrupting a clock signal to a memory without impairing or reducing the performance of the computer system.

These and other objects of the present invention are met by the method of the present invention in which comprising the steps of detecting the status of a memory storage circuit in the computer, generating a status signal indicative of activity of the memory storage circuit in the computer, and interrupting a clock signal to the memory storage circuit in response to the status signal when the status signal indicates the memory storage circuit is inactive or not needed for immediate system function.

The clock signal may be resumed to the memory storage circuit in response to the status signal when the status signal indicates the memory storage circuit is to be accessed.

The memory storage circuit may comprise a static random access memory storage circuit operating synchronously to a clock in a cache in the computer and the clock signal comprises a cache clock signal. The clocked nature of synchronous SRAM causes power usage even when not being accessed. The status signal may comprise an OR-ed combination of an address strobe signal, an idle signal indicating an idle state from a state machine in a cache controller, and a pipeline signal indicative of a pipeline memory access state.

The steps of interrupting the clock signal and resuming of the clock signal may be performed by an AND gate driven by the status signal such that interruption and resumption of the clock signal occur within one clock cycle of an indication from the status signal.

The objects of the present invention are met by an apparatus for reducing power consumption in a computer comprising a detection circuit for detecting the status of a memory storage circuit in the computer and generating a status signal indicative of activity of the memory storage circuit in the computer, and a clock control for interrupting a clock signal to the memory storage circuit in response to a status signal indicating the memory storage circuit is inactive. A clock resume circuit may resume the clock signal to the memory storage circuit in response to the status signal when the status signal indicates memory storage circuit activity.

The memory storage circuit may comprise a static random access memory storage circuit in a cache in the computer and the clock signal comprises a cache clock signal. The status signal may be generated by an OR gate for combining an address strobe signal, an idle signal indicating an idle state from a state machine in a cache controller, and a pipeline signal indicative of a pipeline memory access state and outputting the status signal. The clock may be interrupted and resumed by an AND gate driven by the status signal such that interruption and resumption of the clock signal occur within one clock cycle of an indication from the status signal.

BRIEF DESCRIPTIONS OF THE DRAWINGS

FIG. 2 is a block diagram of the PC of FIG. 1 illustrating how a daughter card may be inserted in place of a 486 processor to upgrade the PC of FIG. 1 to a Pentium® processor or the like.

DETAILED DESCRIPTION OF THE INVENTION

Figure 1:
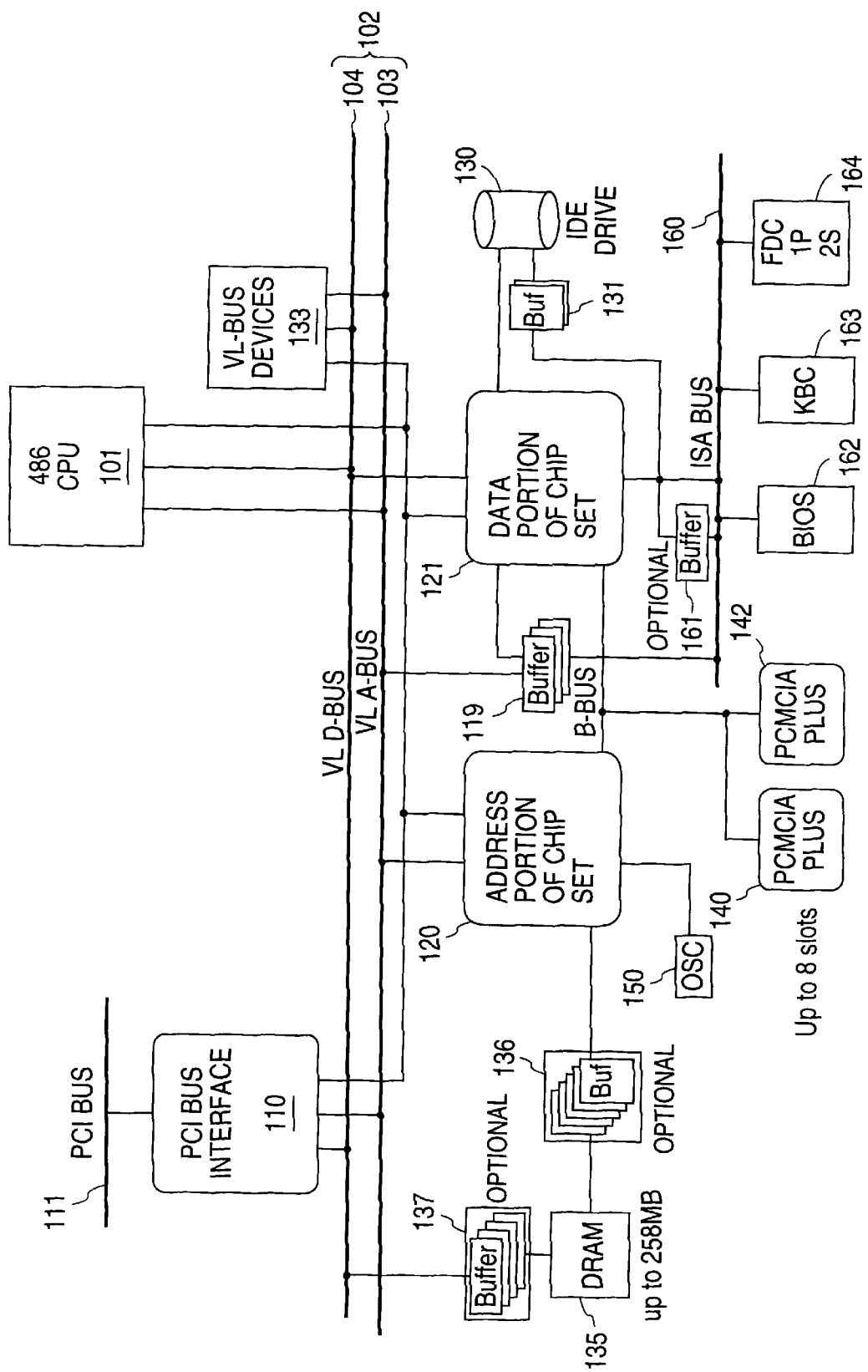
FIG. 1 is a block diagram of a PC using a 486 microprocessor and a VL bus.
Figure 2:
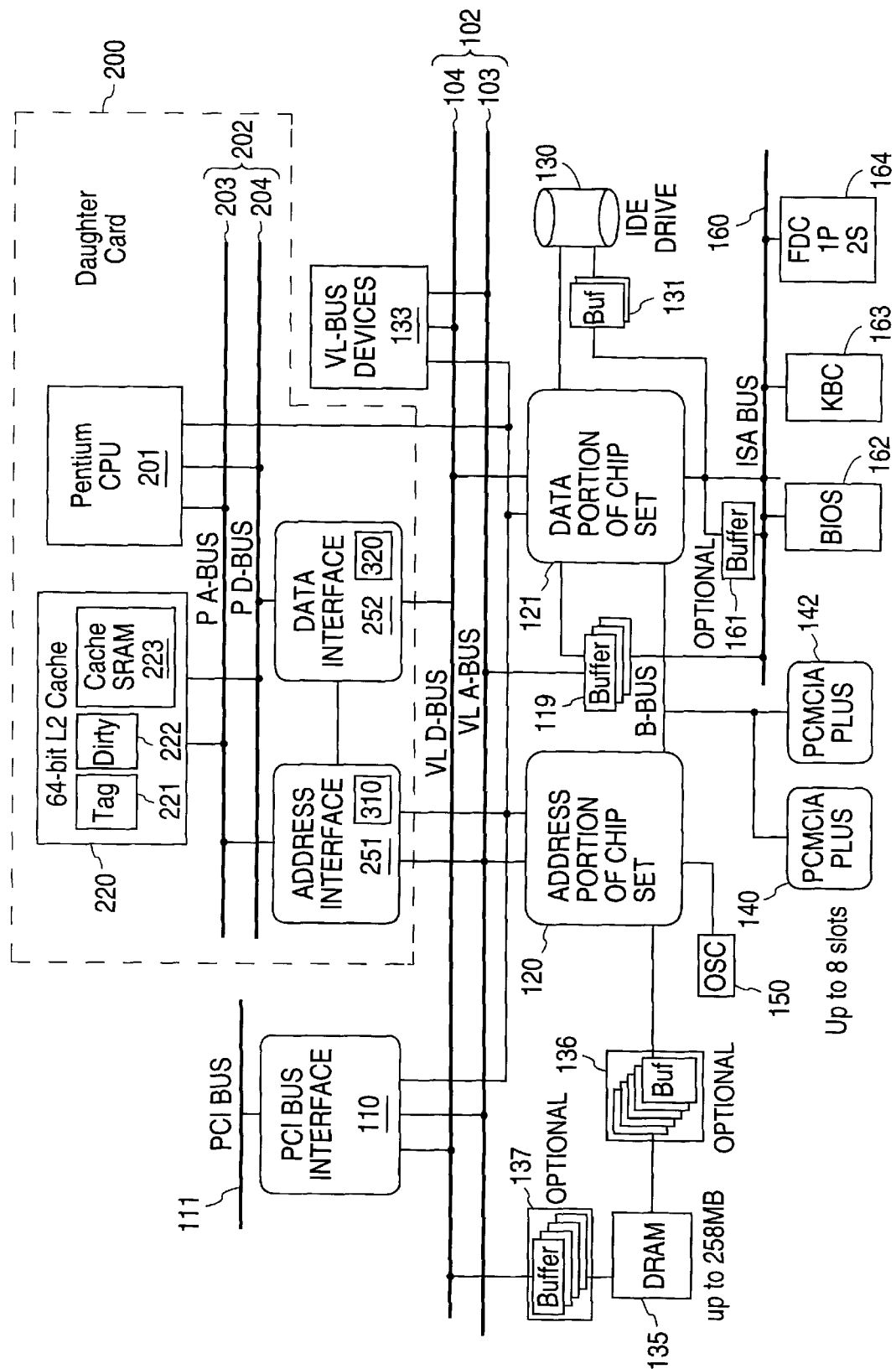

The descriptions of FIGS. 1 and 2 are by way of example only and illustrate the preferred embodiment of the present invention. However, it should be appreciated that the apparatus and method of the present invention may be applied in other types of computer systems having similar or different architectures.

FIG. 1 is a block diagram of a PC using a 486 microprocessor 101 and VL bus 102. 486 type processor 101 may be coupled to VL bus 102 comprising address and data buses 103 and 104, respectively. VL bus 102 is a 32-bit advanced industry standard bus design known in the art. Various VL-bus devices 133 may be coupled to VL bus 102, as is known in the art. VL bus 102 is a synchronous bus design, typically operating at 25 or 33 Mhz, although other operating speeds (e.g., 40 Mhz) are also possible.

In order to provide an interface to PCI bus devices, a PCI interface 110 may also be provided coupling PCI bus 111 to VL bus 102. The PCI bus standard is another industry standard synchronous bus known in the art. PCI bus interface 110 may comprise, for example, Pico/Power® Juniper™ integrated circuit part number 208TQFP manufactured by Pico/Power division of Cirrus Logic, Inc. of Fremont, Calif. Other types of PCI bus interface devices 110 may also be used within the spirit and scope of the invention. Alteratively, no PCI bus interface 110 need be provided if PCI devices are not to be supported.

System chip set 120,121 comprising address portion 120 and data portion 121, may be provided to interface 486 processor 101 to other system components and generate system clocks and the like. Such components may include IDE drive 130 interfaced through buffer 131. It should be noted that other types of drives may also be interfaced within the spirit and scope of the invention (e.g., MFM, RLL, SCSI, or the like) although in the preferred embodiment, an IDE drive may be implemented. Additional components may include system memory 135 interfaced through buffer 136. System memory 135 may comprise, for example, DRAMs of up to 256 MB which may in turn be interfaced directly to VL bus 102 through an optional buffer 137 to provide direct memory access (DMA).

Chip set 120,121 may also provide a B-Bus interface to PCMCIA devices 140 and 142. Although only two PCMCIA devices are illustrated in FIG. 1, typically up to eight such devices may be supported. Such PCMCIA devices 140, 142 are known in the art and may comprise a variety of peripheral types such as fax/modem devices, hard drives, network cards, flash memories, dynamic memory or the like. It should be noted that the provision for interfacing with PCMCIA devices may not be required and thus is an optional feature.

Oscillator 150 may be coupled to chip set 120, 121 to generate a predetermined frequency signal which may be used by chip set 120,121 to generate internal, external, and bus clock signals.

In order to provide compatibility with so-called "legacy" computers (i.e., computer manufactured according to the ISA bus standard), chip set 120, 121 may provide an ISA interface to ISA bus 160 optionally through buffer 161. The ISA bus (Industry Standards Association) is an eight-bit non-synchronous system bus well known in the art. ISA bus 160 may interface to a number of devices, including system BIOS 162, keyboard controller 163, and floppy disk drive controller and serial and parallel port interface 164. In addition, ISA bus 160 may interface with any number of known ISA devices through so-called expansion slots or the like.

Chip set 120, 121 may comprise, for example, the REDWOOD (PT86C668, PT86C618), SEQUOIA (PT86C668, PT86C618A2), or FIR (PT86C868, PT86C881) chip sets manufactured by Pico/Power division of Cirrus Logic, Inc. of Fremont, Calif., although other types of chip sets known in the art may be utilized without departing from the spirit and scope of the present invention.

As can be seen from the block diagram of FIG. 1, the PC of FIG. 1 provides an interface to components of various bus types (VL, ISA, PCI, B-BUS) to provide full backward compatibility to legacy devices as well as compatibility with newer bus designs. However, in order to interface the system of FIG. 1 to a Pentium® processor, additional hardware may be required. The Pentium® processor may use a 64 bit Pentium® bus operating at 50, 60 or 66 Mhz.

FIG. 2 is a block diagram of the PC of FIG. 1 illustrating how daughter card 200 may be inserted in place of a 486 processor to upgrade the PC of FIG. 1 to a Pentium® processor or the like. Daughter card 200 may comprise a printed circuit board provided with a suitable coupling device such that it may be coupled to, for example, a socket designed to accept a 486 type processor. Using daughter card 200, a manufacturer may offer a common PC system design in either 486 or Pentium® models, or may allow a user to upgrade a 486 type PC to Pentium® performance.

As illustrated in FIG. 2, daughter card 200 may include Pentium® processor 201, address interface circuitry 251 and data interface circuitry 252 for interfacing Pentium® processor 201 with a VL bus 102. Address interface circuitry 251 and data interface circuitry 252 may be interfaced to Pentium® processor 201 though Pentium® address bus 203 and Pentium® data bus 204 (collectively Pentium® bus 202). Daughter card 200 may also include a 64 bit wide L2 cache 220 including a cache TAG containing address information for data stored in cache SRAM 223. L2 cache 220 may comprise a synchronous cache which requires a clock signal to clock data in and out of the cache.

In the preferred embodiment, address interface 251 may comprise the Golden Gate PT80C732 device manufactured by Pico/Power division of Cirrus Logic, Inc. of Fremont, Calif. Data interface 252 may comprise the Golden Gate PT80C733 device manufactured by Pico/Power division of Cirrus Logic, Inc. of Fremont, Calif. For purposes of economy, address interface 251 and data interface 252 may be provided as separate components, however, it is within the spirit and scope of the present invention to provide both such components as one device.

If provided as separate devices, address interface 251 and data interface 252 may be provided with separate clock signals. In order to operate properly, such clock signals may need to be carefully synchronized to assure proper operation of daughter card 200. Address interface 251 may be provided with a clock generating circuit to generate a number of clock signals for Pentium® CPU 201, data interface 252 and L2 cache 220. In addition, it may be desirable, in order to conserve energy, to shut down L2 cache 220 by suspending the clock signal to L2 cache 220.

Figure 3:
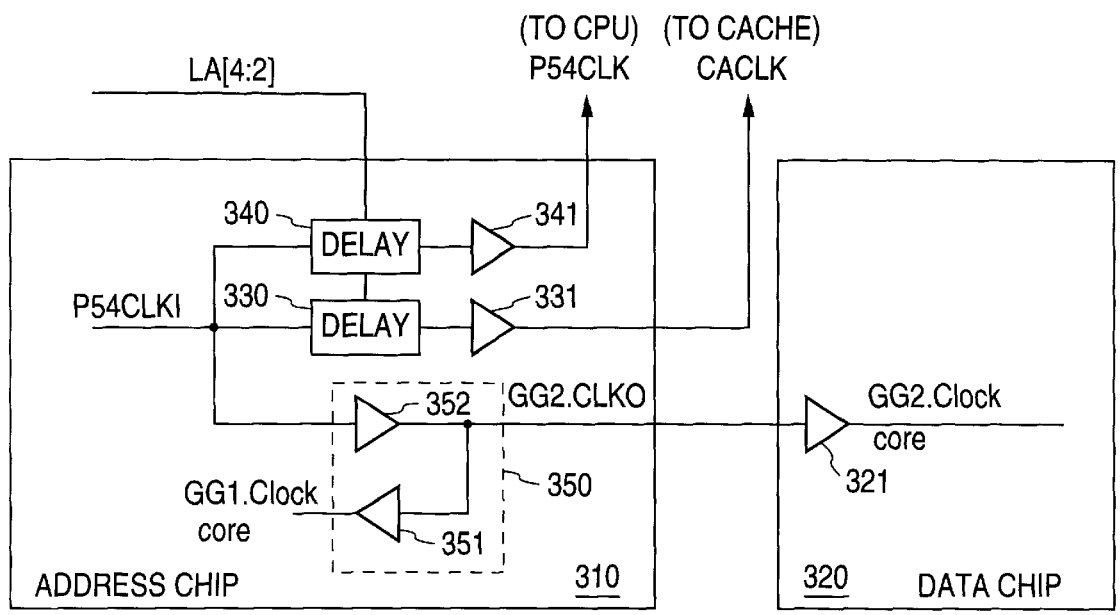
FIG. 3 is a block diagram of a clock control circuit in the address interface of FIG. 2.

FIG. 3 is a block diagram of clock control circuit 310 in address interface 251 and clock control circuit 320 in data interface 252. Clock control circuit 310 may be provided within address interface 251 in the preferred embodiment. Clock controlling circuit 310 is an asynchronous clock interface between Pentium® processor 201 and VL bus 102. Clock control circuit 310 is provided with two independent clock inputs, one for interface with Pentium® CPU 201 (P54CLKI), and the other for interface with VL bus 102 (not shown). Such a design eliminates the need for a phase locked loop (PLL) on daughter card 200, simplifies power management clock control, and reduces power consumption.

The clock signals in FIG. 3 are represented as indicated in Table I. In FIG. 3, "GG1" and "GG2" refer to Golden Gate 1 and Golden Gate 2, the device names for the preferred embodiment of the present invention. The term "clock core" refers to a clock signal internal to a device.

TABLE I

| CLOCK SIGNAL | DESCRIPTION |
| --- | --- |
| P54CLK | Output clock signal for Pentium ® Bus 202 and Pentium ® Processor 201 |
| P54CLKI | Input clock signal for Pentium ® Bus 202 and Pentium ® Processor 201 |
| CACLK | Cache clock for L2 Cache 220 |
| GG1.Clock Core | Core clock for address interface 251 |
| GG2.Clock Core | Core clock for data interface 252 |

Asynchronous interface of clock control circuit 310 may be handled by a request/acknowledge handshake protocol. In the preferred embodiment, the ratio of clock frequencies between the clock for Pentium® CPU 201 (P54CLK) and the clock for VL bus 102 (not shown) may be in the range of 1.5 to 3.0. Secured data flow may be guaranteed for the asynchronous clock mode by feeding in appropriate frequencies. Three output clock drivers are generated, one for Pentium® CPU 201 (P54CLK), one for data interface 252 (GG2.CLKO) and one for L2 cache 220 (CACLK).

Clock control circuit 310 is designed to keep four clock signals in sync: the clock for address interface 251 (GG1.Clock core), the clock for data interface 252 (GG2.clock core), the clock for Pentium® CPU 201 (P54CLK), and the clock for L2 cache 220 (CACLK). Synchronization of these four clocks is achieved by matching delays of the internal clock trees with adjustable delay cells 330 and 340 to precisely balance all four delays. Clock skew between the four clocks may be kept to less than 0.5 nS.

Bits LA[4:2] may represent a clock skew adjust value stored in a RESET sample register within address interface 251. The values for bits LA[4:2] may also be input through pins in address interface 251. The three bits representing LA[4:2] may provide a skew adjust between the internal version of the Pentinum® CPU 201 clock P54CLKI and the two external clocks P54CLK and CACLK. LA[4:2] are reset sampled pins which may not be defined by default, but rather must be pulled up or down.

Once LA[4:2] are sampled on reset, the skew adjust value may be further adjusted only for CACLK output after boot by rewriting bits LA[4:2]. Due to CPU PLL requirements, P54CLK cannot be adjusted without a 1 mS PLL latency period. Table II illustrates the skew values and tolerances generated by bits LA[4:2] in the preferred embodiment of the present invention.

TABLE II

| LA4 | LA3 | LA2 | Delay (nS) | Tolerance (nS) |
| --- | --- | --- | --- | --- |
| 0 | 0 | 0 | 0.00 | ±0.5 |
| 0 | 0 | 1 | −0.55 | ±0.25 |
| 0 | 1 | 0 | −1.1 | ±0.5 |
| 0 | 1 | 1 | −1.65 | ±0.75 |
| 1 | 0 | 0 | +0.55 | ±0.25 |
| 1 | 0 | 1 | +1.1 | ±0.5 |
| 1 | 1 | 0 | +1.65 | ±0.75 |
| 1 | 1 | 1 | +2.20 | ±1.0 |

Clock skew control may be provided as a design precaution in order to compensate for potential variations in clock speed in atypical systems. However, if clock traces are routed properly on the daughter card, such skew adjustment may be unnecessary. Preferably, clock traces should be routed by hand and visually inspected. Sharp corners should be avoided and serial/parallel terminating resistors should be used to prevent unwanted reflections of the clock signal.

Clock control circuit 310 may be provided with CPU clock driver 341, cache clock driver 331, interface clock driver 352, and address interface clock driver 351. Clock control circuit 320 may be provided with data interface clock driver 321. In the preferred embodiment, each of clock drivers 331, 341, 352, and 351 may comprise a high speed 24 mA driver provided to maximize rise and fall times of the respective clock signals. In the preferred embodiment, the maximum "flight time" between high and low level clock signals should be less than 1 nS, which equates to approximately 20 pF of capacitance with a 50 Ohm serial resistor. Data interface clock driver 351 may comprise a 12 mA clock driver whose delay will track between chips.

Address interface 251 may control power consumption within the computer system of FIG. 2 by minimizing power consumption within L2 cache 220 when L2 cache 220 is not in use. Power consumption of SRAM 223 within L2 cache 220 may be minimized by deactivating clock signal CACLK. L2 cache 220 may be activated or deactivated by logic provided within delay element 330, comprising, for example, combinational logic circuitry (e.g., AND gate) activated by external switching signals as will be discussed below in connection with FIG. 4.

Figure 4:
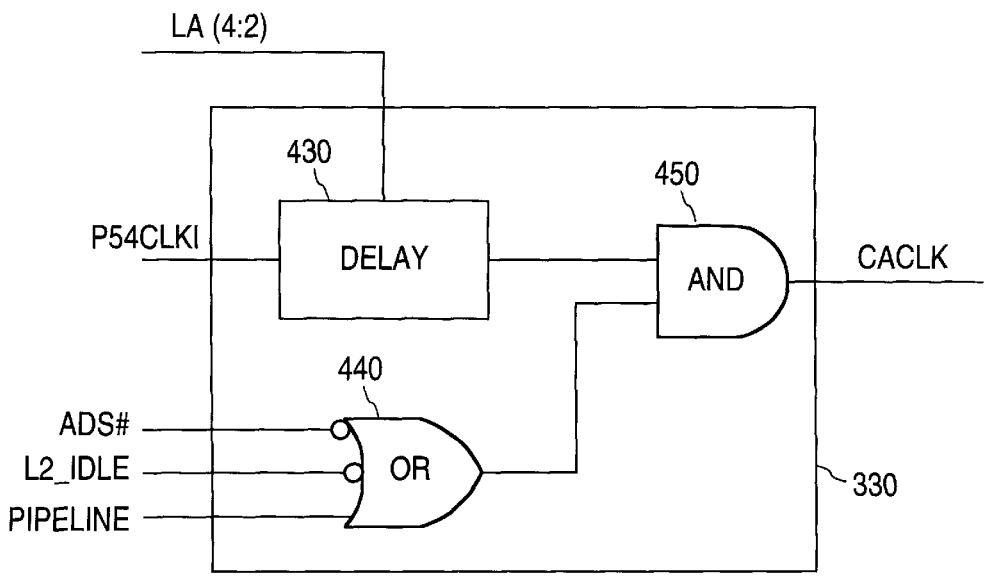
FIG. 4 is a block diagram of a delay circuit in the clock control circuit of FIG. 3.

FIG. 4 is a block diagram illustrating the major components of delay 330 within address interface clock control 310. Delay 330 may comprise a delay element 430 which operates to provide a skew control according to control bits LA[4:2] as discussed above. Delay 330 further comprises AND gate 450 which may control the output of L2 cache clock signal CACLK. AND gate 450 is controlled by OR gate 440. OR gate 440 may receive a number of inputs determining whether L2 cache 220 is in use.

In the preferred embodiment, three inputs may be provided to OR gate 440 to determine whether L2 cache 220 is in use, however, other numbers of inputs may be provided depending upon the type and operation of L2 cache 220. In general, any input which goes high when L2 cache is in use may be utilized as in input to OR gate 440.

Address Strobe signal ADS# indicates that a request for data has been made to system memory 135 by the presence of a valid data address and cycle definition from Pentium® CPU 201. Address Strobe signal ADS# may be input to pin 59 of the Golden Gate™ PT80C732 address interface chip from Pentium® CPU 201. If an access is made to system memory 135, L2 cache 220 may be utilized to return cached data. Thus, if signal ADS# goes low, L2 cache 220 should be active. Signal ADS# thus is fed to an inverted input of OR gate 440 which in turn activates AND gate 450 to maintain CACLK signal to L2 cache 220.

A second input to OR gate 440 is signal L2__IDLE, which indicates whether L2 cache 220 is currently idle. If L2 cache 220 is in the middle of a cycle, clock signal CACLK should not be turned off until the end of that cycle. Signal L2__IDLE will remain low during a cache cycle (e.g., cache hit) and go high at the end of the cycle. Signal L2__IDLE is fed to another inverted input of OR gate 440. If the output of OR gate 440 goes low, clock signal CACLK will be shut off by AND gate 450 at the end of the cache cycle.

A third input to OR gate 440 is signal PIPELINE. Signal PIPELINE indicates whether pipelining is active. If, in the middle of a transaction between Pentium® CPU 201 and system memory 135, pin NA# (next address) is asserted, Pentium® CPU 201 will send an ADS# signal for the next transaction while returning data for a previous transaction. Signal PIPELINE may thus be generated whenever signal NA# is asserted during a transaction, indicating pipelining is occurring. Signal PIPELINE may then be passed through OR gate 440 to activate AND gate 450 to keep CACLK active.

Of course, other types of signals indicating the status of L2 cache 220 may be utilized as inputs to OR gate 440 to control cache clock CACLK. A simple state machine may be used to determine the status of L2 cache 220. For example, a prior art controller for L2 cache 220 may comprise a state machine, with each state having a flip-flop register for each state. One of the states of such a prior art controller for L2 cache 220 may be an L2 idle state. The contents of the corresponding state register may thus be used, for example, to generate an L2__IDLE signal as illustrated in FIG. 4.

The use of combinational logic circuitry in delay circuit 330 reduces or eliminates any delays in activating or deactivating clock signal CACLK. When L2 cache 220 is to be reactivated, typically by generation of an ADS# signal, clock signal CACLK is almost instantaneously activated, the only delays being those incurred due to gate delay. Thus, L2 cache 220 may be deactivated or reactivated in a transparent manner without interrupting processing within the overall computer system.

Deactivating signal CACLK may significantly reduce power consumption within SRAM 223 of LZ cache 220. SRAM 223 may comprise CMOS logic circuitry, which typically draws relatively large amounts of power when clock signal CACLK is switching. Power consumption to SRAM 223 is particularly reduced if SRAM 223 is a synchronous SRAM, synchronized to a system or cache clock. The clocked ratio of a synchronous SRAM raises power usage when compared to a corresponding asynchronous SRAM, even when a synchronous SRAM is not being accessed. With signal CACLK off, SRAM 223 will maintain its memory contents within minimal power. Signal CACLK, however, is required to read or write data to or from SRAM 233.

In the preferred embodiment, in address interface 251 as implemented by Golden Gate part number PT80C732, cache power consumption control may be activated or deactivated by setting bit 3 of miscellaneous configuration register 2 (index 09H). If bit 3 is set to 0, L2 cache clock CACLK is active at all times. If bit 3 is set to 1, L2 cache clock may be disabled on bus idle cycles.

Thus, the clock controlling circuit of the present invention may control the clock signal CACLK to L2 cache 220 to shut down clock signal CACLK when L2 cache 220 is inactive. Shutting down clock signal CACLK significantly reduces power consumption within SRAM 223. The use of combinational logic circuitry allows L2 cache 20 to be reactivated in a seamless transparent manner.

While the preferred embodiment and various alternative embodiments of the invention have been disclosed and described in detail herein, it may be apparent to those skilled in the art that various changes in form and detail may be made therein without departing from the spirit and scope thereof.

For example, while illustrated herein as applied to an L2 cache, the clock control circuit and method of the present invention may also be applied to other types of memories or circuits where shutdown of a clock signal may reduce power consumption. Moreover, although illustrated herein in the preferred embodiment as being applied to an interface circuit supplied in a daughter card, the apparatus and technique of the present invention may be applied or supplied in other circuitry within a computer system without departing from the spirit and scope of the present invention.

What is claimed is:

1. A method for reducing power consumption in an L2 cache in a computer, the method comprising the steps of:

detecting operating status of a memory in the L2 cache;

generating a status signal indicative of activity of the memory, the status signal comprising an OR-ed combination of an address strobe signal, an idle signal indicating an idle state from a state machine in a cache controller, and a pipeline signal indicative of a pipeline memory access state;

interrupting a cache clock signal to the memory in response to the status signal when the status signal indicates cache inactivity; and resuming the cache clock signal to the memory in response to the status signal when the status signal indicates cache activity, wherein the steps of interrupting the cache clock signal and resuming the cache clock signal are performed by an AND gate driven by the status signal such that interruption and resumption of the cache clock signal occurs within one clock cycle of an indication from the status signal.

2. The method of claim 1 wherein said pipeline signal is generated when a next address signal is received during a memory access cycle.

3. A computer system comprising:

an L2 cache that includes a memory;

detection means, coupled to the L2 cache, for detecting status of the memory;

status signal generating means, coupled to the detection means, for generating a status signal indicative of L2 cache activity, said means for generating comprising an OR gate for combining an address strobe signal, an idle signal indicating an idle state from a state machine in a cache controller, and a pipeline signal indicative of a pipeline memory access state;

combined means for interrupting and resuming a cache clock signal to said memory, coupled to the means for generating and to the cache clock signal, for interrupting the cache clock signal in response to the status signal when the status signal indicates cache inactivity and for resuming the cache clock signal to said memory in response to the status signal when the status signal indicates cache activity, said combined means for interrupting and resuming comprising an AND gate driven by the status signal such that interruption and resumption of the cache clock signal occur within one clock cycle of an indication from the status signal; and a programmable variable delay, coupled to the cache clock signal and the combined means for resuming and interrupting the cache clock signal, for delaying the cache clock signal by a predetermined programmable amount to compensate for clock delays induced between said processor and said bus interface.

4. The computer system of claim 3 wherein said pipeline signal is generated when a next address signal is received during a memory access cycle.

5. A computer system comprising:

a processor for processing data;

a bus interface, coupled to the processor, for interfacing the processor with at least one system bus;

a main memory, coupled to the bus interface, for storing data; and a cache memory, coupled to the bus interface and the main memory and coupled through the at least one system bus to the processor for storing recently accessed data;

said bus interface comprising:

a clock controller for controlling clock signals to at least said cache memory, said clock controller receiving a status signal indicative of activity of the cache memory, interrupting clock signals to said cache memory when said cache memory is inactive, and resuming clock signals to said cache memory when the status signal indicates cache memory activity, said clock controller comprising:

an OR gate for receiving and combining an address strobe signal, a cache idle status signal, and a pipeline processing status signal, and outputting the status signal;

an AND gate coupled to said OR gate and driven by the status signal such that interruption and resumption of the clock signals occur within one clock cycle of an indication from the status signal; and a programmable variable delay, coupled to the clock signals and the AND gate for delating the cache clock signal by a predetermined programmable amount to compensate for clock delays induced between said processor and said bus interface.

* * * * *